(12) United States Patent
Liu

(10) Patent No.: US 10,183,627 B1
(45) Date of Patent: Jan. 22, 2019

(54) BIKE CARRIER

(71) Applicant: Yao-Huang Liu, Tainan (TW)

(72) Inventor: Yao-Huang Liu, Tainan (TW)

( * ) Notice: Subject to any disclaimer, the term of this patent is extended or adjusted under 35 U.S.C. 154(b) by 0 days.

(21) Appl. No.: 15/860,728

(22) Filed: Jan. 3, 2018

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ....... B60R 9/06; B60R 9/10; B60R 2011/008; B60R 2011/0082; B60R 2011/0085; B60R 2011/0087
See application file for complete search history.

(56) References Cited

U.S. PATENT DOCUMENTS

| | | | | |
|---|---|---|---|---|
| 5,104,015 A * | 4/1992 | Johnson | ................... | B60R 9/06 224/401 |
| 7,055,725 B1 * | 6/2006 | Kolda | ...................... | B60R 9/06 224/497 |
| 7,261,229 B1 * | 8/2007 | Allen | ...................... | B60R 9/06 224/495 |
| 7,631,791 B1 * | 12/2009 | Allen | ...................... | B60R 9/10 224/503 |
| 2005/0035168 A1 * | 2/2005 | Prescott | ................... | B60R 9/06 224/503 |
| 2006/0273125 A1 * | 12/2006 | Bogoslofski | ............. | B60R 9/06 224/509 |
| 2008/0230579 A1 * | 9/2008 | Wang | ........................ | B60R 9/10 224/400 |
| 2010/0096424 A1 * | 4/2010 | Kuschmeader | ........... | B60R 9/06 224/509 |
| 2010/0320247 A1 * | 12/2010 | Wang | ........................ | B60R 9/10 224/567 |
| 2013/0062383 A1 * | 3/2013 | Jeli | .......................... | B60R 9/10 224/497 |
| 2018/0072237 A1 * | 3/2018 | Kuschmeader | ........... | B60R 9/10 |

* cited by examiner

*Primary Examiner* — Corey Skurdal
(74) *Attorney, Agent, or Firm* — Alan D. Kamrath; Kamrath IP Lawfirm, P.A.

(57) ABSTRACT

A bike carrier contains: a base, a connection rod, a first clutch device, and a second clutch device. The base includes a support rod and a fixing rod rotatably connected with the support rod. The first clutch device is defined between the support rod and the fixing rod of the base, and the first clutch device includes a first rotary knob and a first slider driven by the first rotary knob so that the support rod and the fixing rod are rotatably fixed between a vertical position and a horizontal position. The second clutch device is connected between the base and the connection rod, and the second clutch device includes a second rotary knob and a second slider driven by the second rotary knob so that the base and the connection rod are rotatably fixed among a using position, a collapsible position, and a declining position.

9 Claims, 15 Drawing Sheets

＃ BIKE CARRIER

BACKGROUND OF THE INVENTION

Field of the Invention

The present invention relates to a bike carrier, and more particularly to the bike carrier which is collapsible and is operated easily.

Description of the Prior Art

A bicycle is mounted on a conventional bike carrier of a vehicle popularly.

The conventional bike carrier is fixed on a roof of the vehicle or on a rear end (i.e., a rear trunk) of the vehicle, wherein it is assembled easily when the bike carrier is fixed on the rear end of the vehicle.

However, a size of the bike carrier is large so the bike carrier is connected on or is removed from the vehicle troublesomely and occupies a storage space of the vehicle. To overcome this problem, a collapsible bike carrier is developed so as to reduce its size and storage space. Nevertheless, the collapsible bike carrier is removable and collapsible by screwing screw bolts with positioning holes or by retaining locking bolts in the positioning holes. Thus, a tool (such as a wrench) is required in a manual pushing and pulling manner, thus consuming operation force greatly.

The present invention has arisen to mitigate and/or obviate the afore-described disadvantages.

SUMMARY OF THE INVENTION

The primary objective of the present invention is to provide a bike carrier which is rotatably operated so as to save effort.

To obtain above-mentioned objectives, a bike carrier provided by the present invention contains: a base, a connection rod, a first clutch device, and a second clutch device.

The base includes a support rod and a fixing rod rotatably connected with the support rod.

The first clutch device is defined between the support rod and the fixing rod of the base, the first clutch device includes a first rotary knob configured to be rotated and a first slider driven by the first rotary knob so that the support rod and the fixing rod are rotatably fixed between a vertical position and a horizontal position.

The second clutch device is connected between the base and the connection rod, and the second clutch device includes a second rotary knob and a second slider driven by the second rotary knob so that the base and the connection rod are rotatably fixed among a using position, a collapsible position, and a declining position.

DETAILED DESCRIPTION OF THE PREFERRED EMBODIMENTS

Figure 1:
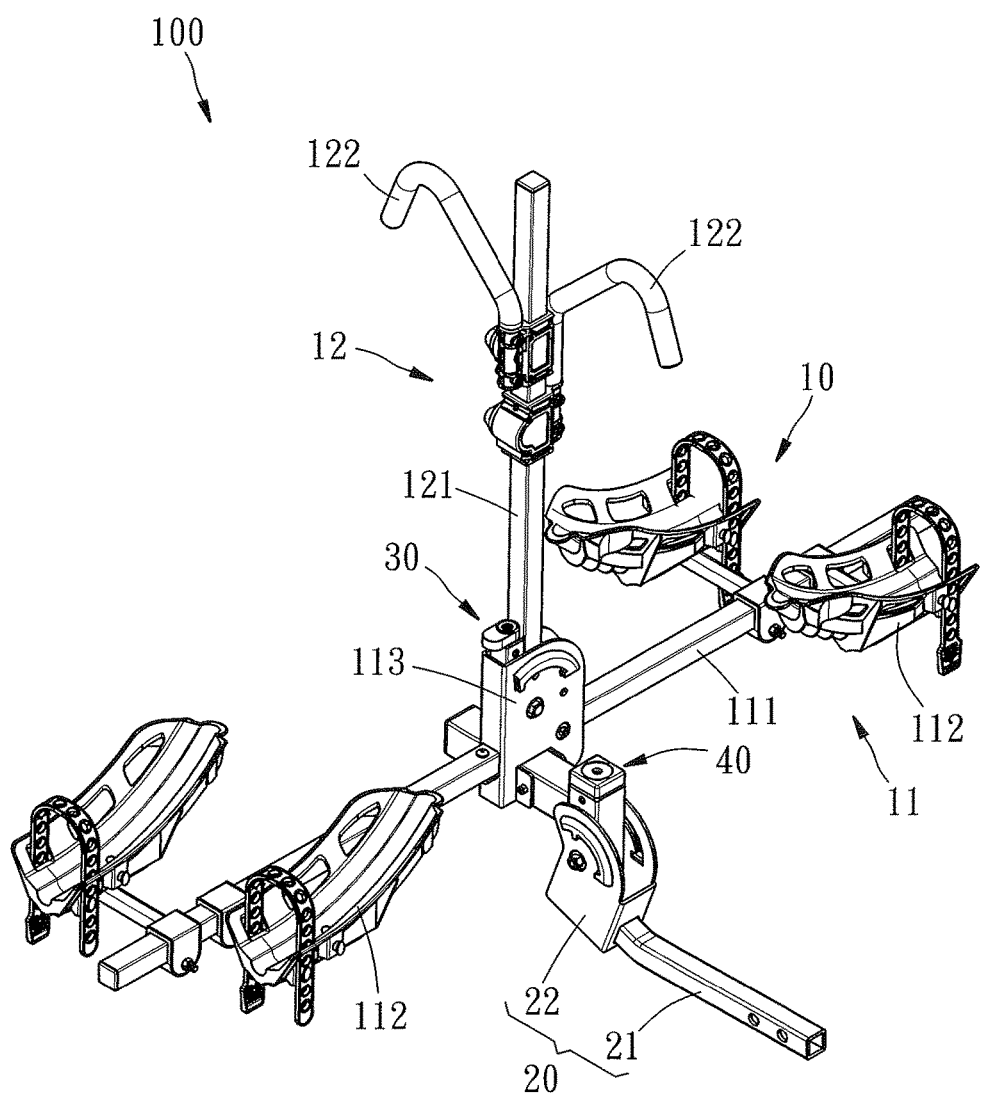
FIG. 1 is a perspective view showing the assembly of a bike carrier according to a preferred embodiment of the present invention.
Figure 2:
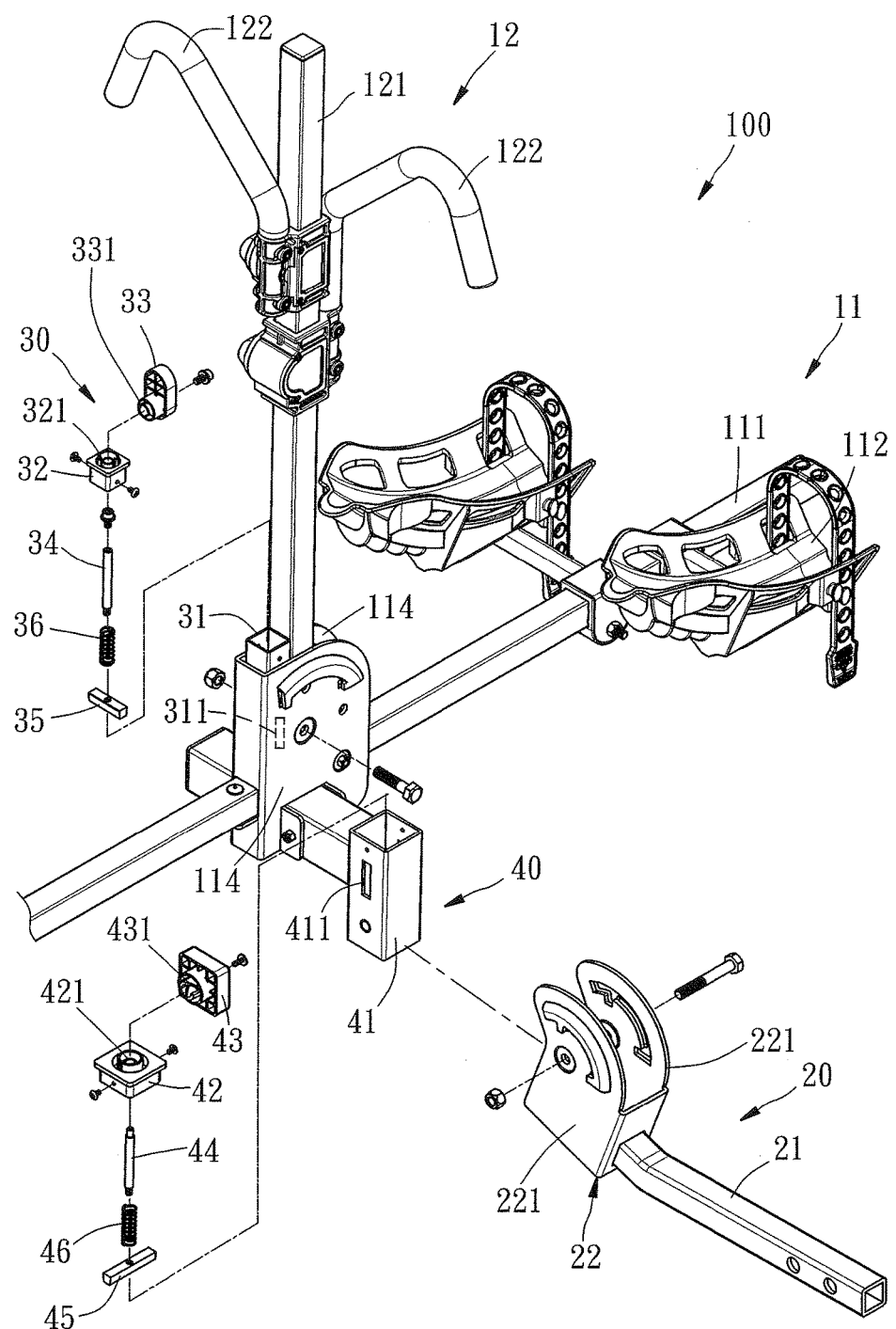
FIG. 2 is a perspective view showing the exploded components of a part of the bike carrier according to the preferred embodiment of the present invention.
Figure 3:
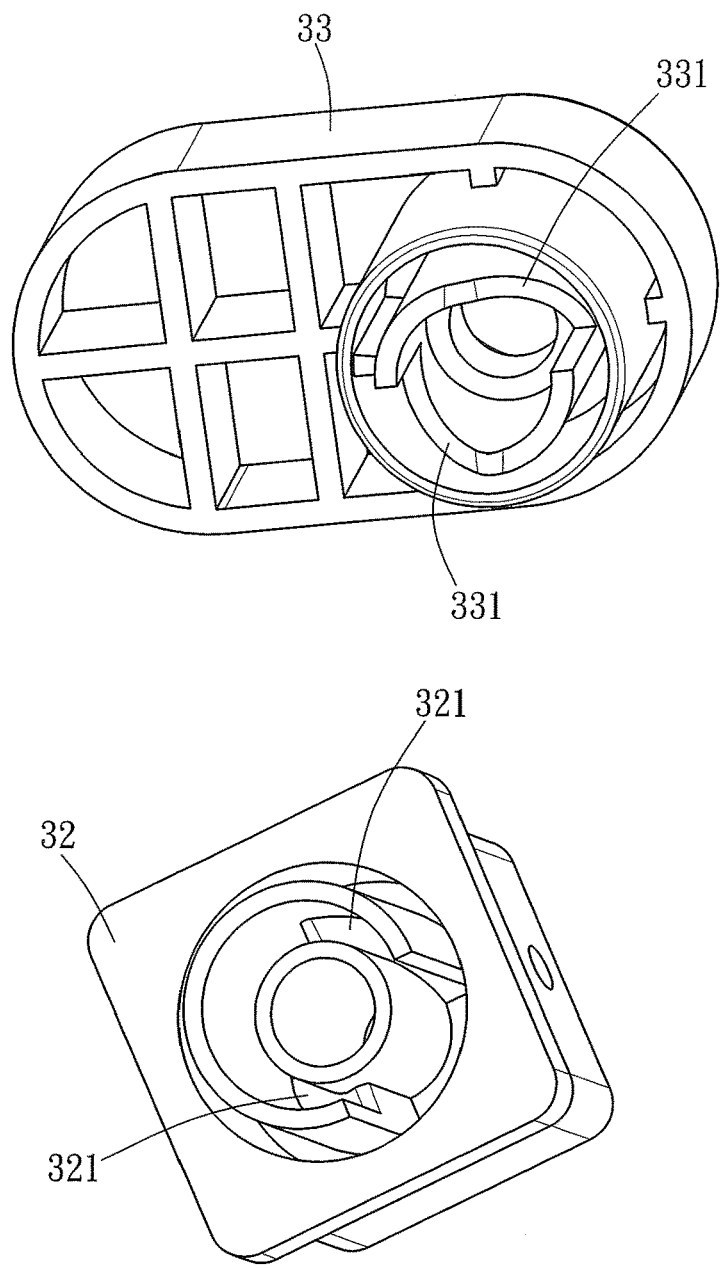
FIG. 3 is another perspective view showing the exploded components of a part of the bike carrier according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-15, a bike carrier 100 in accordance with a preferred embodiment of the present invention comprises: a base 10, a connection rod 20, a first clutch device 30, and a second clutch device 40.

The base 10 includes a support rod 11 and a fixing rod 12. The support rod 11 has a bottom post 111, at least two holding discs 112, and a first slide seat 113, wherein the at least two holding discs 112 are arranged on two ends of the bottom post 111 respectively and slide on the bottom post 111 so as to adjust a distance between the at least two holding discs 112 and to fix a wheel of a bicycle by way of the at least two holding discs 112. The first slide seat 113 is mounted on the bottom post 111 and has two parallel first sliding sheets 114 separated a predetermined distance from each other, wherein each of the two parallel first sliding sheets 114 has a first arcuate groove 115 defined on an inner surface thereof, a vertical positioning groove 116 extending downwardly from a first end of the first arcuate groove 115, and a first foldable positioning groove 117 extending downwardly from a second end of the first arcuate groove 115. The fixing rod 12 has an upright column 121 and at least one hook 122, wherein one end of the upright column 121 is rotatably connected on the bottom post 111 of the support rod 11, and the at least one hook 122 is arranged and slidably fixed on the upright column 121 so as to hook on a bicycle frame.

The connection rod 20 includes an extension 21 and a second slide seat 22, a first end of the extension 21 is removably connected with a distal end of a vehicle, and a second end of the extension 21 is coupled with the second slide seat 22, wherein the second slide seat 22 has two parallel second sliding sheets 221 separated a predetermined distance from each other, each of the two parallel second sliding sheets 221 has a second arcuate groove 222 defined on an inner surface thereof, a second foldable positioning groove 223 extending downwardly from a first end of the second arcuate groove 222, a locating groove 224 extending downwardly from a second end of the second arcuate groove 222, and an obliquely arcuate trough 225 curvedly extending from a distal end of the second arcuate groove 222.

The first clutch device 30 is defined between the support rod 11 and the fixing rod 12 of the base 10 so that the fixing rod 12 reciprocatingly rotates and is positioned between a vertical position and a horizontal position. The first clutch device 30 includes a first connector 31, a first drive member 32, a first rotary knob 33, a first coupling pillar 34, a first slider 35, and a first spring 36. The first connector 31 is disposed on the upright column 121 of the fixing rod 12 of the base 10, and the first connector 31 has a first recess 311 vertically extending thereon; the first drive member 32 is fixed on the first connector 31, and the first drive member 32 has two first chutes 321 formed on a top thereof and semi-circularly extending thereon; the first rotary knob 33 has two first bevel planes 331 semi-circularly extending on a bottom thereof so that the two first bevel planes 331 abut against the two first chutes 321 of the first drive member 32 respectively; a first end of the first coupling pillar 34 connects with the first rotary knob 33; the first slider 35 couples with a second end of the first coupling pillar 34, and two ends of the first slider 35 insert through the first recess 311 of the first connector 31 so that the first slider 35 is fixed in the first arcuate groove 115; the first spring 36 is biased against the first drive member 32 and the first slider 35 so as to provide elasticity to the first slider 35.

Figure 4:
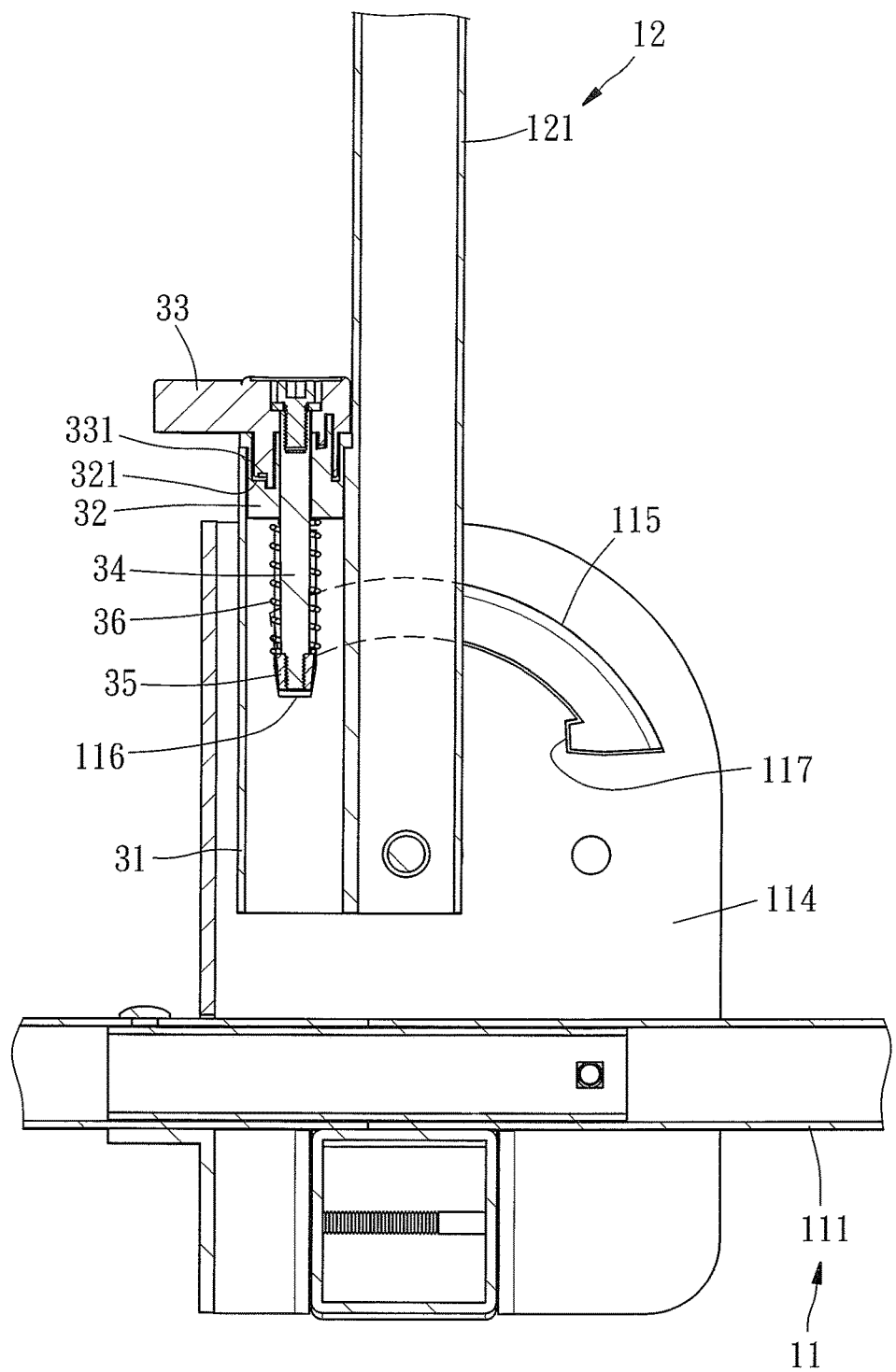
FIGS. 4-6 are cross sectional views showing the operation of the first clutch device of the bike carrier according to the preferred embodiment of the present invention.
Figure 5:
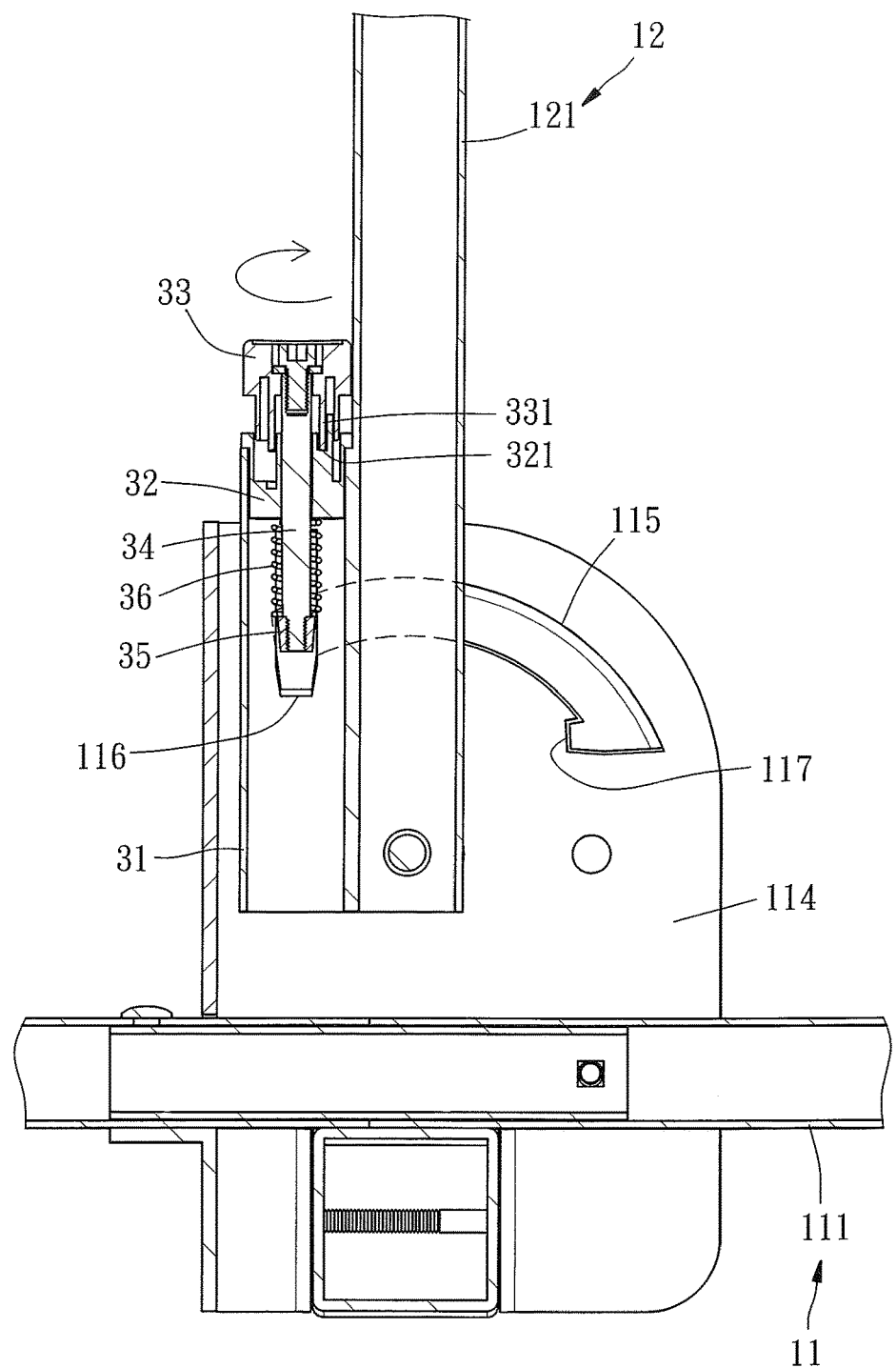
Figure 6:
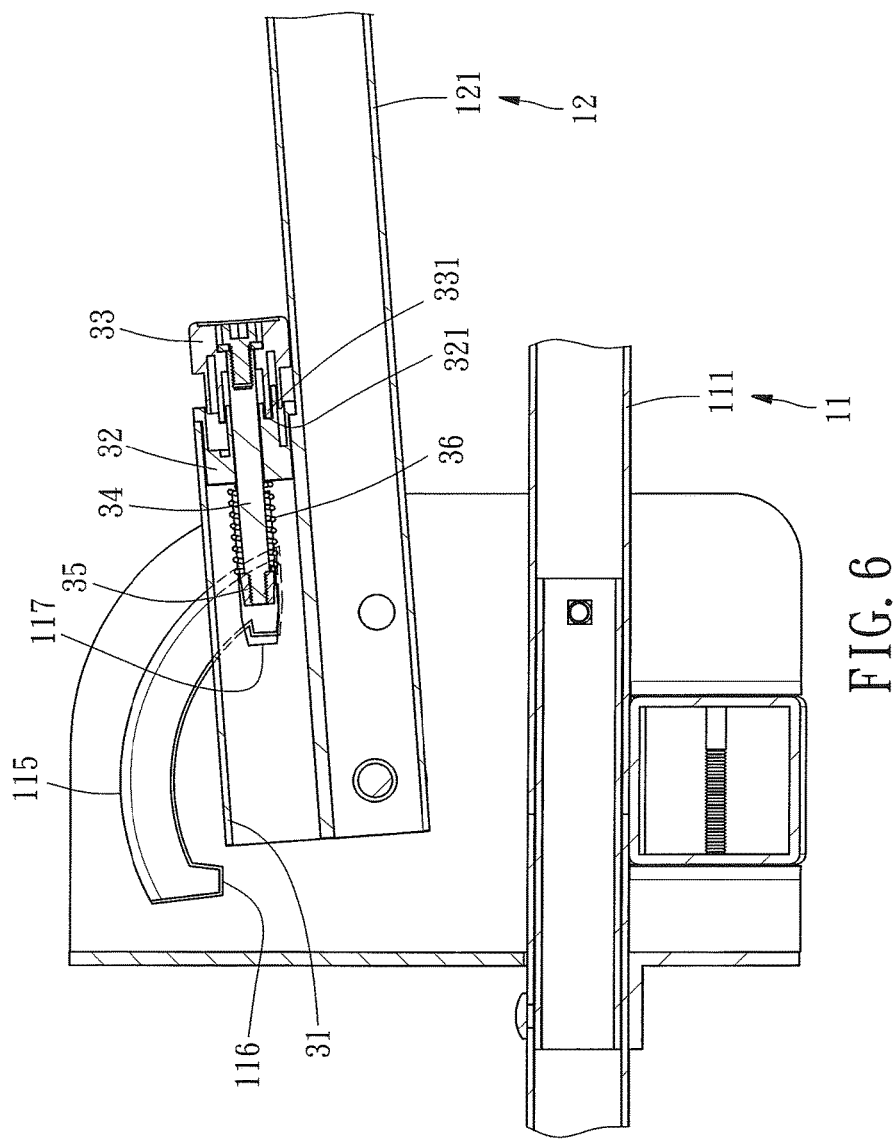
Figure 7:
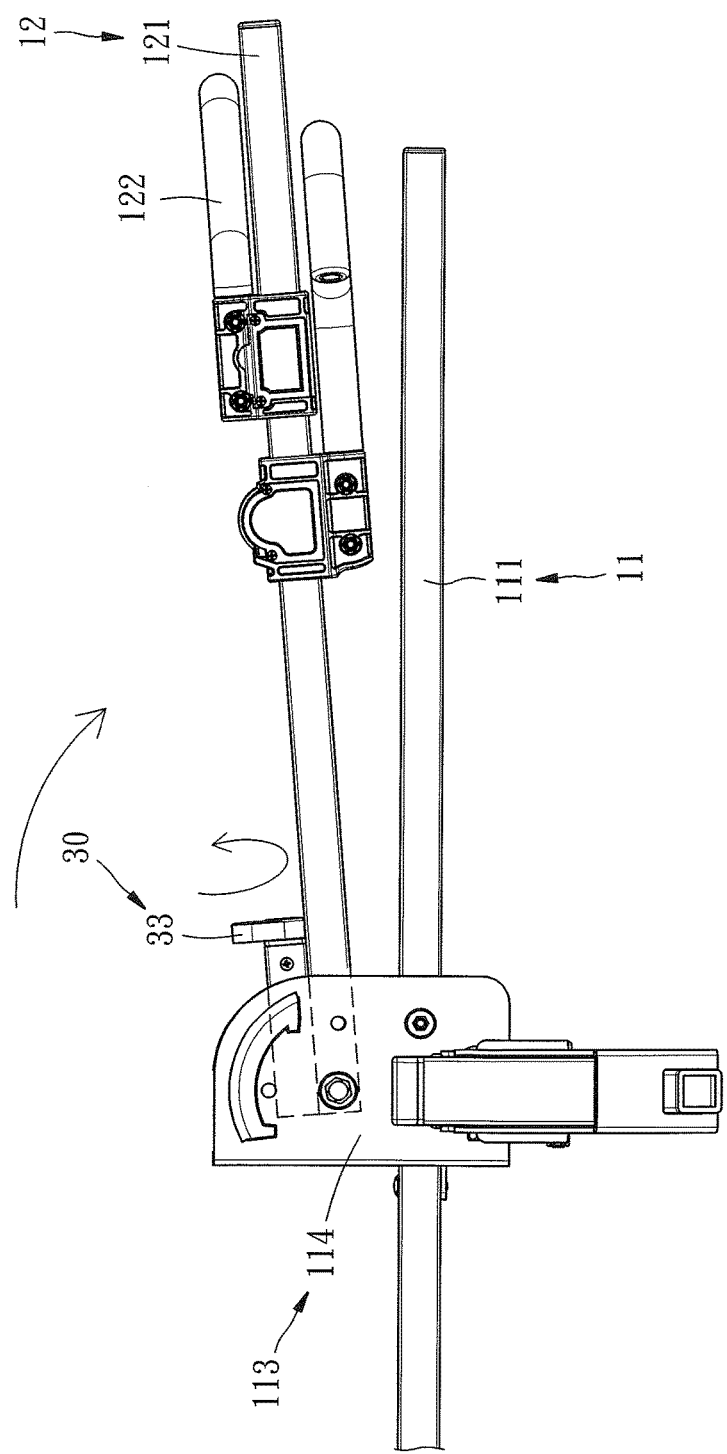
FIG. 7 is a side plane view showing the operation of a first clutch device of the bike carrier according to the preferred embodiment of the present invention.
Figure 8:
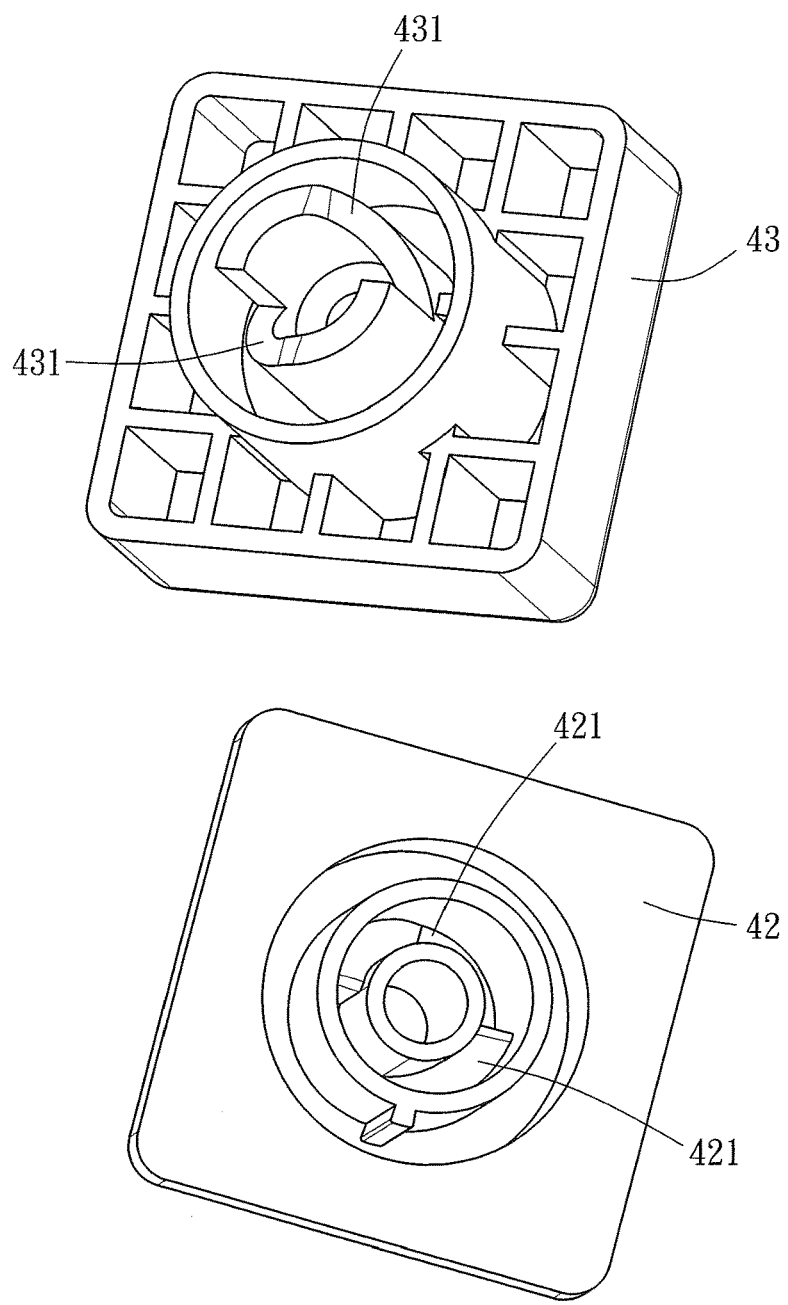
FIG. 8 is the other perspective view showing the exploded components of a part of the bike carrier according to the preferred embodiment of the present invention.

Thereby, when the first slider 35 is located in the vertical positioning groove 116 (as shown in FIG. 4), the fixing rod 12 is mounted on the vertical position so as to fix the bicycle frame. As desiring to fold the fixing rod 12 on the horizontal position, the first rotary knob 33 is rotated by a user so as to rotatably move upward in the two first chutes 321 by using the two first bevel planes 331 respectively, and the first coupling pillar 34 pulls the first slider 35 to move to the first arcuate groove 115 from the vertical positioning groove 116 (as shown in FIG. 5) so that the fixing rod 12 is rotated by the user to the horizontal position, thereafter the first slider 35 moves close to the first foldable positioning groove 117 along the first arcuate groove 115 so that the first spring 36 pushes the first slider 35 into the first foldable positioning groove 117 (as illustrated in FIG. 6), hence the fixing rod 12 is fixed on the horizontal position (as shown in FIG. 7). In the meantime, the first rotary knob 33 is forced by the first slider 35 in the first foldable positioning groove 117 so that the two first bevel planes 331 rotatably move downward in the two first chutes 321.

The second clutch device 40 is connected between the base 10 and the connection rod 20 so that the connection rod 20 is rotatably fixed among a using position, a collapsible position, and a declining position reciprocatingly. The second clutch device 40 includes a second connector 41, a second drive member 42, a second rotary knob 43, a second coupling pillar 44, a second slider 45, and a second spring 46. The second connector 41 is disposed on the bottom post 111 of the support rod 11 of the base 10, and the second connector 41 has a second recess 411 vertically extending thereon; the second drive member 42 is fixed on the second connector 41, and the second drive member 42 has two second chutes 421 formed on a top thereof and semi-circularly extending thereon; the second rotary knob 43 has two second bevel planes 431 semi-circularly extending on a bottom thereof so that the two second bevel planes 431 abut against the two second chutes 421 of the second drive member 42 respectively; a first end of the second coupling pillar 44 connects with the second rotary knob 43; the second slider 45 couples with a second end of the second coupling pillar 44, and two ends of the second slider 45 insert through the second recess 411 of the second connector 41 so that the second slider 45 is fixed in the second arcuate groove 222; the second spring 46 is biased against the second drive member 42 and the second slider 45 so as to provide elasticity to the second slider 45.

Figure 9:
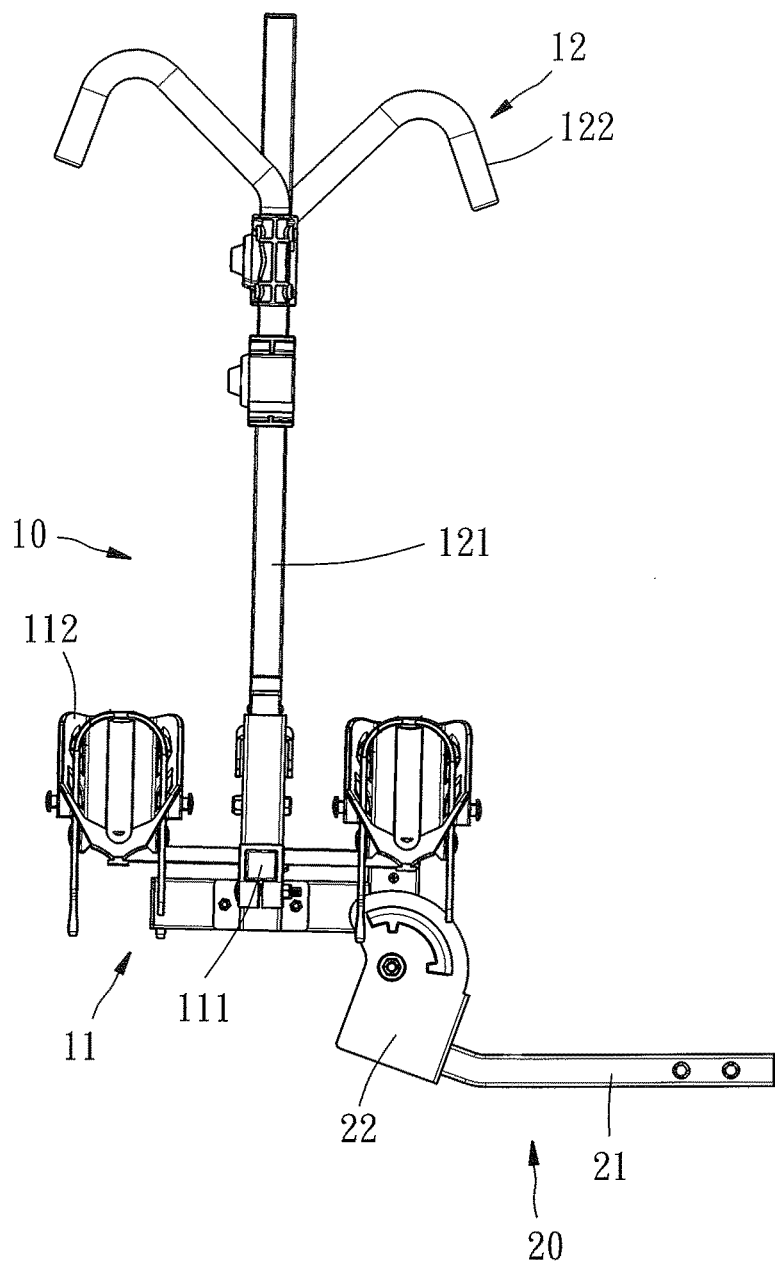
FIG. 9 is a side plane view showing the operation of a second clutch device of the bike carrier according to the preferred embodiment of the present invention.
Figure 10:
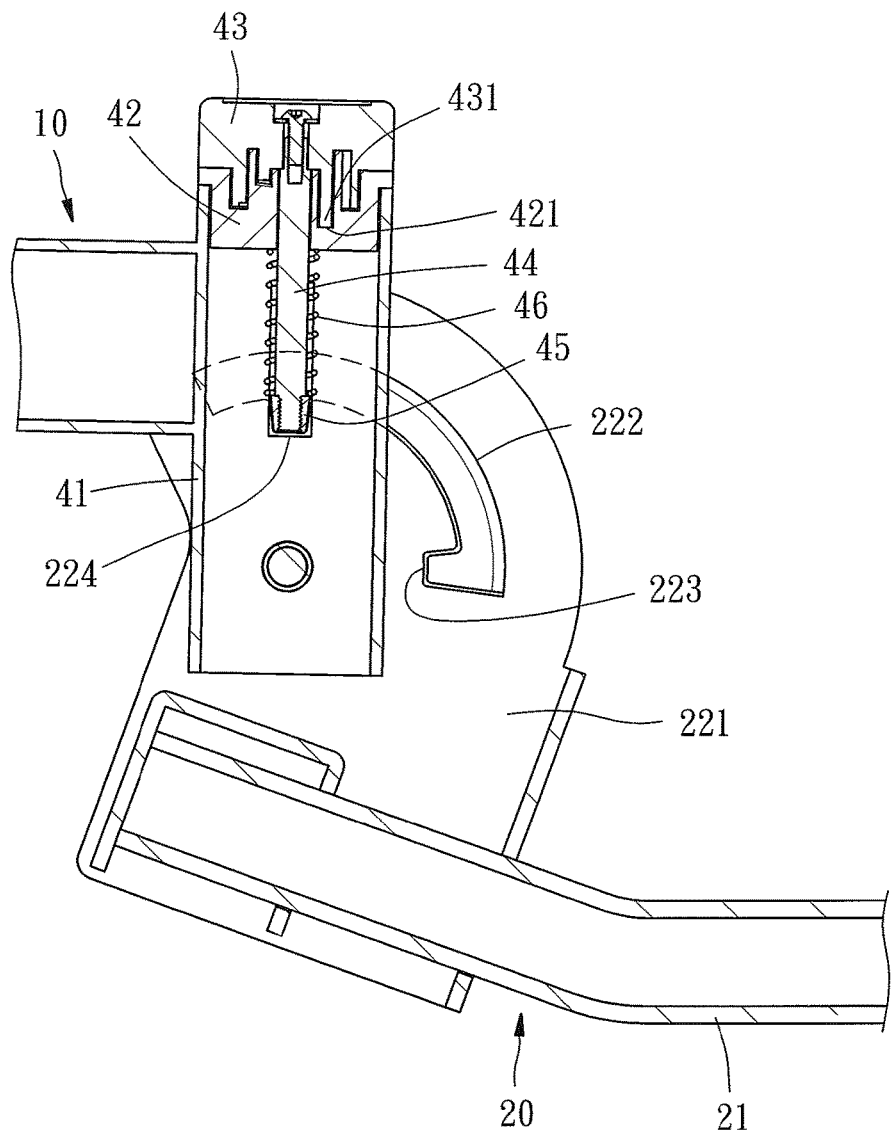
FIGS. 10-13 are cross sectional views showing the operation of the second clutch device of the bike carrier according to the preferred embodiment of the present invention.
Figure 11:
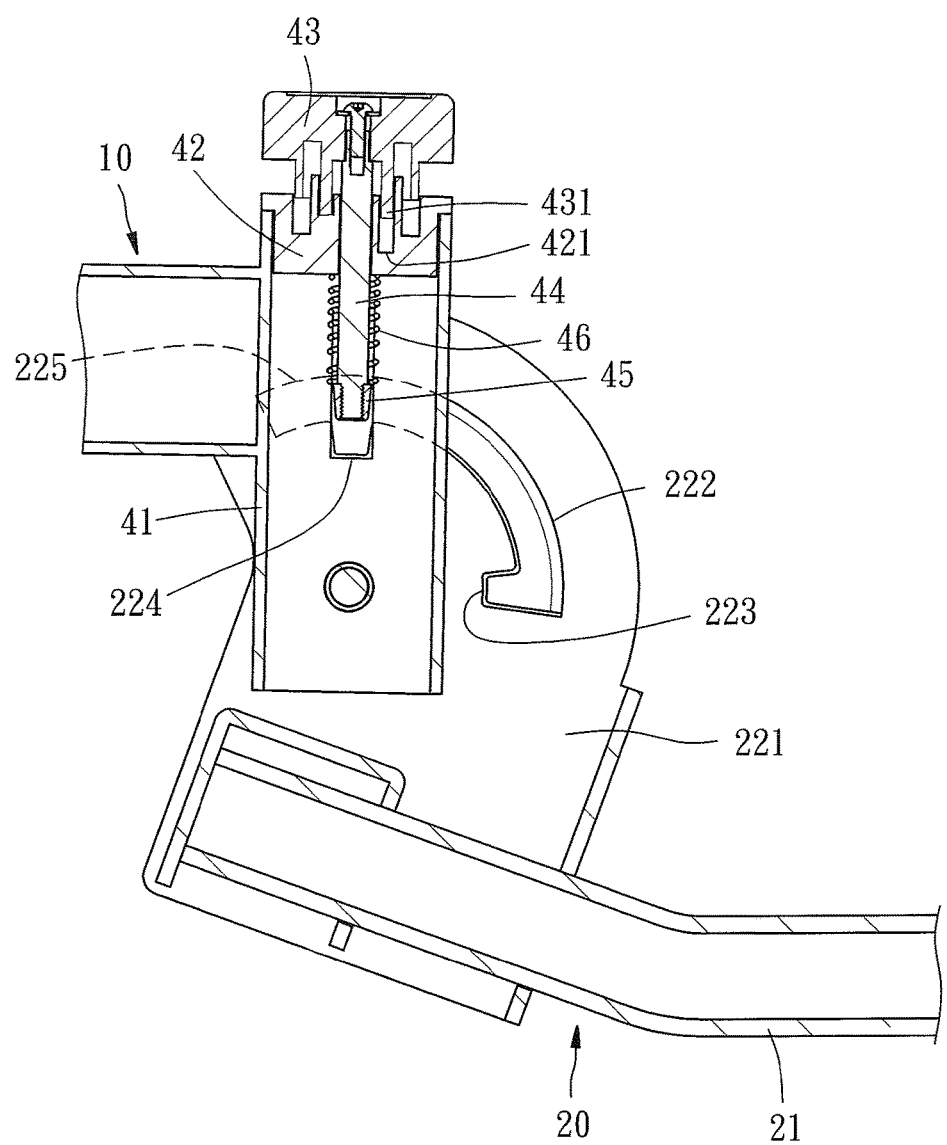
Figure 12:
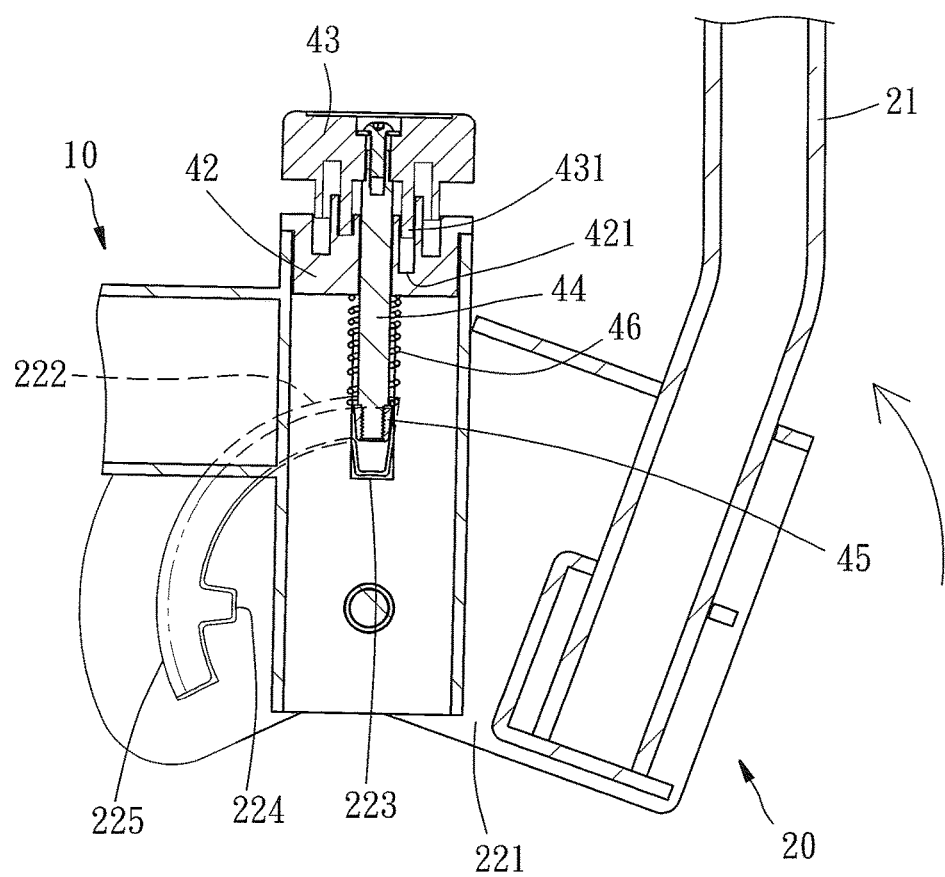
Figure 13:
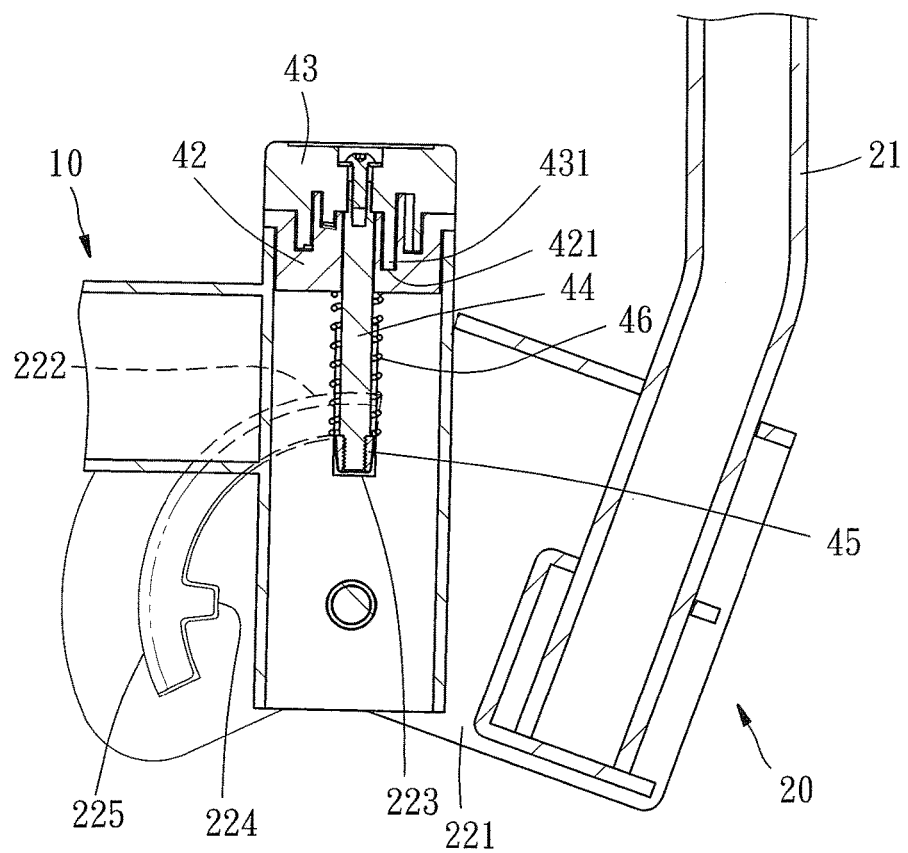
Figure 14:
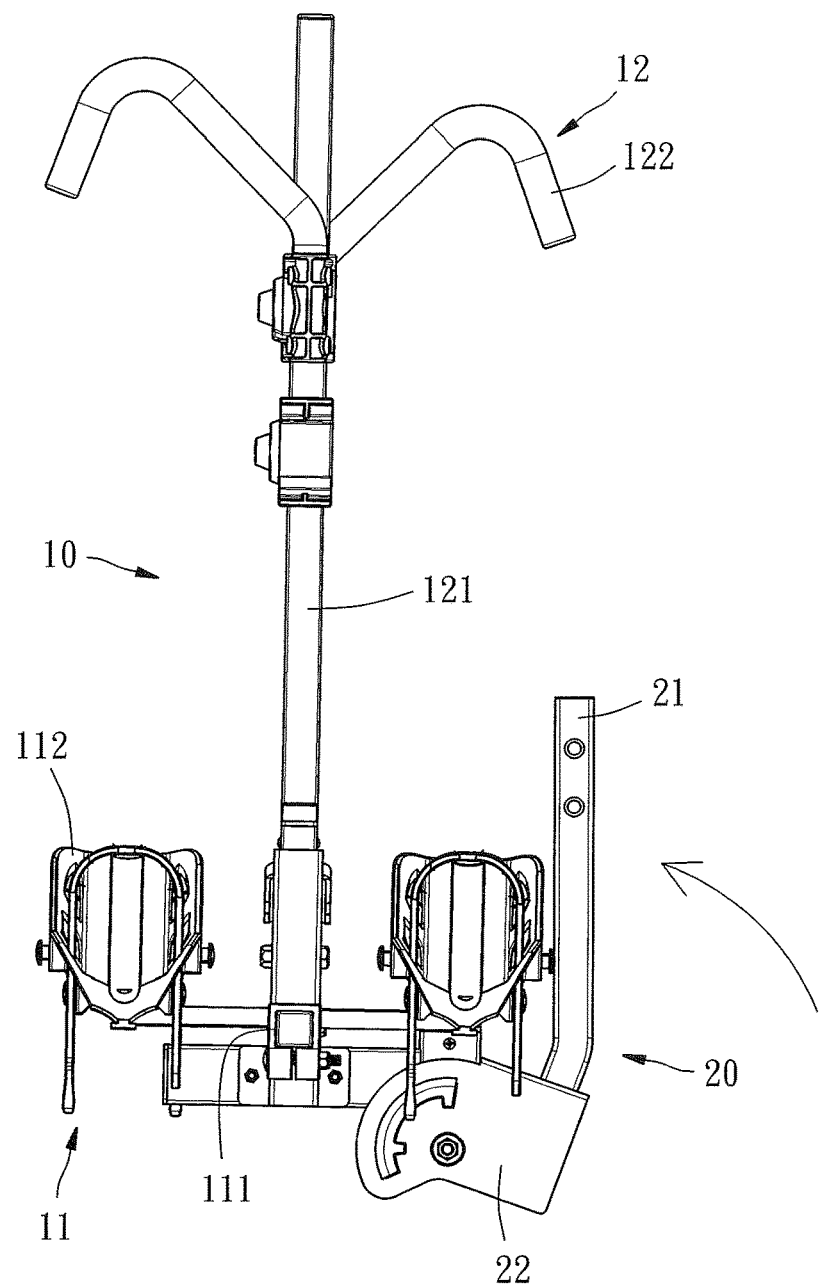
FIG. 14 is another side plane view showing the operation of the second clutch device of the bike carrier according to the preferred embodiment of the present invention.

Thereby, when the second slider 45 is located in the locating groove 224 (as shown in FIG. 10), the base 10 is mounted on a user position (as illustrated in FIG. 9) so as to fix the bicycle. As desiring to fold the connection rod 12 on the collapsible position after removing the connection rod 20 from the vehicle, the second rotary knob 43 is rotated by the user so as to rotatably move upward in the two second chutes 421 by using the two second bevel planes 431 respectively, and the second coupling pillar 44 pulls the second slider 45 to move to the second arcuate groove 222 from the locating groove 224 (as shown in FIG. 11) so that the connection rod 20 is rotated by the user toward the collapsible position (as shown in FIG. 14), thereafter the second slider 45 moves close to the second foldable positioning groove 223 (as illustrated in FIG. 12) along the second arcuate groove 222 so that the second spring 46 pushes the second slider 45 into the second foldable positioning groove 223 (as illustrated in FIG. 13), hence the connection rod 20 is fixed on the collapsible position (as shown in FIG. 14). In the meantime, the second rotary knob 43 is forced by the second slider 45 in the locating groove 223 so that the two second bevel planes 431 rotatably move in the two second chutes 421 downward.

Figure 15:
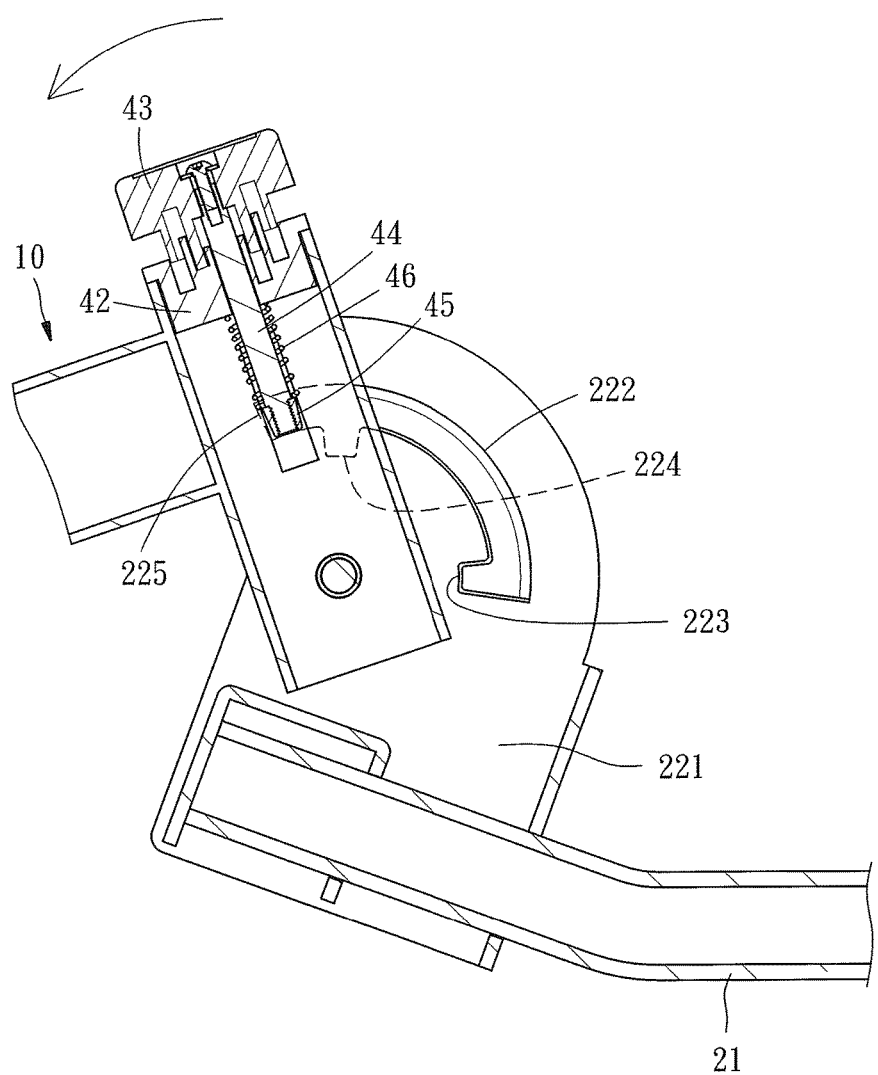
FIG. 15 is another cross sectional view showing the operation of the second clutch device of the bike carrier according to the preferred embodiment of the present invention.

When the bike carrier is connected on the vehicle and a rear door of the vehicle is opened, the second rotary knob 43 is rotated so that the second slider 45 moves into the second arcuate groove 222, and the base 10 is pushed away from the rear door, hence the second slider 45 is pushed into the obliquely arcuate trough 225 (as shown in FIG. 15), thus increasing a tilted angle between the base 10 and the vehicle so as to open the rear door easily. Thereafter, the base 10 is pushed back to an original position so that the second slider 45 moves into the locating groove 224 along the second arcuate groove 222.

Accordingly, the support rod 11 and the connection rod 12 of the base 10 are folded between the vertical position and the horizontal position by using the first clutch device 30. Preferably, the bike carrier is rotated easily by way of the two first bevel planes 331 of the first rotary knob 33 and the two first chutes 321 of the first drive member 32 so as to save effort and to have easy operation.

The base 10 and the connection rod 20 are rotated among the using position, the collapsible position, and the declining position reciprocatingly by way of the second clutch device 40. Preferably, the bike carrier is rotated easily by way of the two second bevel planes 431 of the second rotary knob 43 and the two second chutes 421 of the second drive member 42 so as to save effort and to easy operation.

While various embodiments in accordance with the present invention have been shown and described, it is clear to those skilled in the art that further embodiments may be made without departing from the scope of the present invention.

What is claimed is:
1. A bike carrier comprising:
   a base including a support rod and a fixing rod rotatably connected with the support rod;
   a connection rod;
   a first clutch device defined between the support rod and the fixing rod of the base, the first clutch device including a first rotary knob configured to be rotated and a first slider driven by the first rotary knob so that the support rod and the fixing rod are rotatably fixed between a vertical position and a horizontal position;

a second clutch device connected between the base and the connection rod, and the second clutch device including a second rotary knob and a second slider driven by the second rotary knob so that the base and the connection rod are rotatably fixed among a using position, a collapsible position, and a declining position.

2. The bike carrier as claimed in claim 1, wherein the support rod has a bottom post, at least two holding discs, and a first slide seat, wherein the at least two holding discs are arranged on two ends of the bottom post respectively, and the first slide seat is mounted on the bottom post so as to connect with the first clutch device.

3. The bike carrier as claimed in claim 2, wherein the fixing rod has an upright column and at least one hook, wherein one end of the upright column is rotatably connected on the bottom post of the support rod, and the at least one hook is arranged and slidably fixed on the upright column.

4. The bike carrier as claimed in claim 1, wherein the support rod of the base has a first slide seat, and the first slide seat and has two parallel first sliding sheets separated a predetermined distance from each other, wherein each of the two parallel first sliding sheets has a first arcuate groove defined on an inner surface thereof, a vertical positioning groove extending downwardly from a first end of the first arcuate groove, and a first foldable positioning groove extending downwardly from a second end of the first arcuate groove, wherein the first slide seat slides among the first arcuate groove, the vertical positioning groove, and the first foldable positioning groove.

5. The bike carrier as claimed in claim 4, wherein the first clutch device further includes a first connector, a first drive member, a first coupling pillar, and a first spring; the first connector is disposed on the fixing rod of the base, the first connector has a first recess vertically extending thereon; the first drive member is fixed on the first connector, and the first drive member has at least one first chute formed on a top thereof and semi-circularly extending thereon; the first rotary knob has at least one first bevel plane semi-circularly extending on a bottom thereof so that the at least one first bevel plane abuts against the at least one first chute of the first drive member; a first end of the first coupling pillar connects with the first rotary knob; the first slider couples with a second end of the first coupling pillar, and two ends of the first slider insert through the first recess of the first connector so that the first slider is fixed in the first arcuate groove, the vertical positioning groove, and first foldable positioning groove; the first spring is biased against the first drive member and the first slider so as to provide elasticity to the first slider.

6. The bike carrier as claimed in claim 4, wherein when the support rod and the fixing rod are located on the vertical position, the first slider is fixed in the vertical positioning groove; when the support rod and the fixing rod is located on the horizontal position, the first slider is mounted in the first foldable positioning groove.

7. The bike carrier as claimed in claim 1, wherein the connection rod includes an extension and a second slide seat, the second slide seat is coupled with one end of the extension, wherein the second slide seat has two parallel second sliding sheets separated a predetermined distance from each other, each of the two parallel second sliding sheets has a second arcuate groove defined on an inner surface thereof, a second foldable positioning groove extending downwardly from a first end of the second arcuate groove, a locating groove extending downwardly from a second end of the second arcuate groove, and an obliquely arcuate trough curvedly extending from a distal end of the second arcuate groove; the second slider is fixed in the second arcuate groove, the second foldable positioning groove, and the locating groove, and the obliquely arcuate trough.

8. The bike carrier as claimed in claim 7, wherein the second clutch device includes a second connector, a second drive member, a second coupling pillar, and a second spring; the second connector is disposed on the support rod of the base, and the second connector has a second recess vertically extending thereon; the second drive member is fixed on the second connector, and the second drive member has at least one second chute formed on a top thereof and semi-circularly extending thereon; the second rotary knob has at least one second bevel planes semi-circularly extending on a bottom thereof so that the at least one second bevel plane abuts against the at least one second chute of the second drive member; a first end of the second coupling pillar connects with the second rotary knob; the second slider couples with a second end of the second coupling pillar, and two ends of the second slider insert through the second recess of the second connector so that the second slider is fixed in the second arcuate groove, the second foldable positioning groove, the locating groove, and the obliquely arcuate trough; the second spring is biased against the second drive member and the second slider so as to provide elasticity to the second slider.

9. The bike carrier as claimed in claim 7, wherein when the base and the connection rod are located on the using position, the second slider is fixed in the locating groove; when the base and the connection rod are located on the collapsible position, the second slider is fixed in the second foldable positioning groove; when the connection rod are located on the declining position, the second slider is fixed in the obliquely arcuate trough.

* * * * *